June 21, 1927.
J. N. BARTLETT
1,633,204
AMUSEMENT DEVICE
Filed Oct. 14, 1926
2 Sheets-Sheet 1
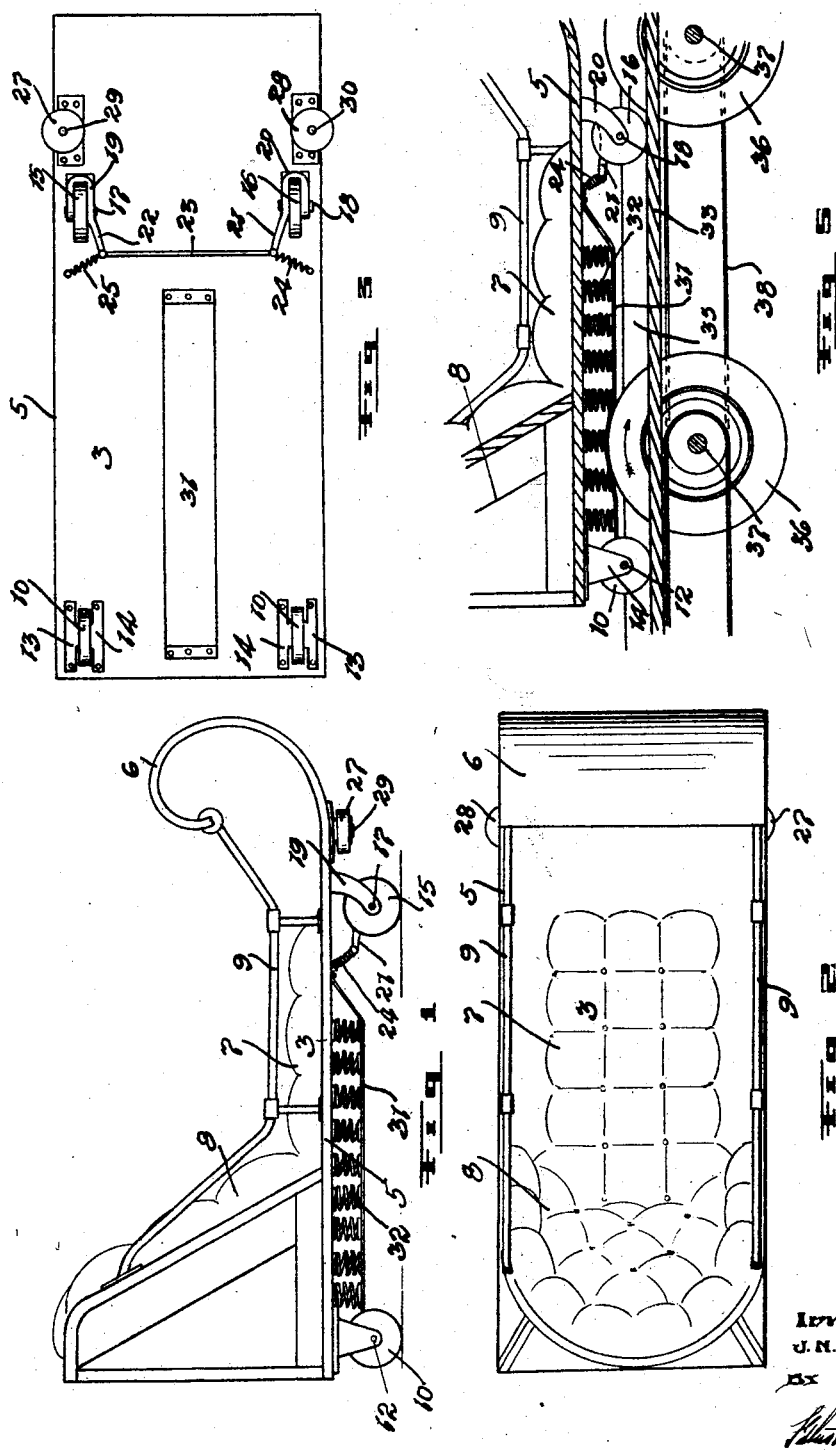
Inventor
J. N. Bartlett June 21, 1927.
J. N. BARTLETT
AMUSEMENT DEVICE
Filed Oct. 14, 1926    2 Sheets-Sheet 2
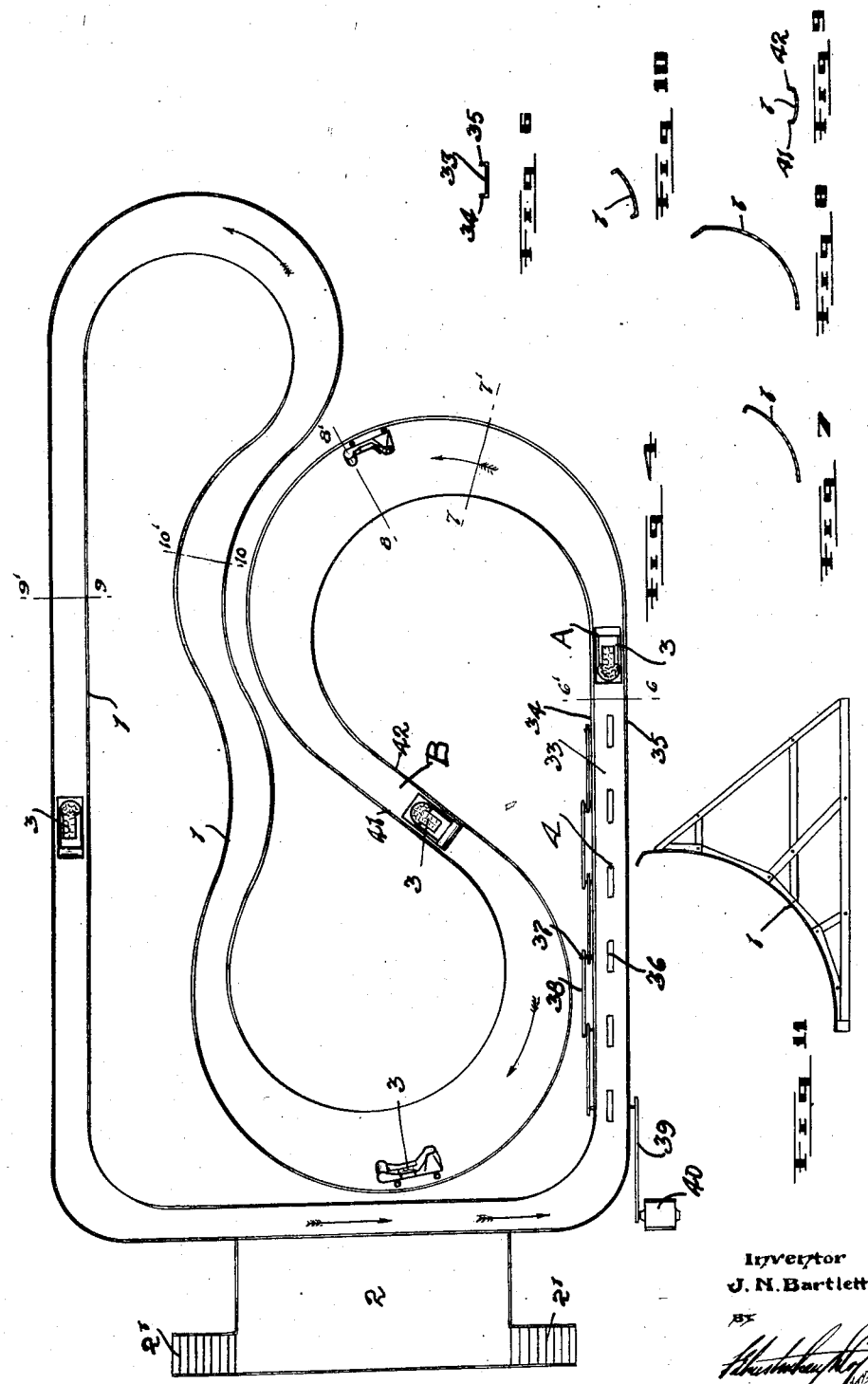
Inventor
J. N. Bartlett Patented June 21, 1927.

1,633,204

UNITED STATES PATENT OFFICE.

JOHN N. BARTLETT, OF WINNIPEG, MANITOBA, CANADA.

AMUSEMENT DEVICE.

Application filed October 14, 1926. Serial No. 141,648.

The invention relates to improvements in amusement devices and an object of the invention is to provide a device embodying a banked runway, wheeled passenger carriers for operating on the runway and means for delivering the carrier onto the runway at a comparatively high velocity, the design of the runway being such that the carriers will be self steering throughout their entire course and whilst giving the occupants thereof the desired thrills as required in a publicly used amusement device of this class.

A further object of the invention is to provide a simply constructed appliance for propelling the carriers at a high velocity onto the runway, the propelling device being designed so that the velocity of the passing carrier is gradually increased to the desired discharge velocity.

A further object is to provide a carrier simulating a toboggan and having forward castor wheels and provided with a comfortable seat and equipped on the under side wtih a resilient member adapted to be frictionally engaged by the propelling device.

A further object is to design the whole device so that it can be readily transported from place to place and easily assembled.

With the above more important objects in view, the invention consists essentially in the arrangement and construction of parts hereinafter more particularly described, reference being had to the accompanying drawings, in which:—

Fig. 1 is a side view of the carrier.

Fig. 2 is a plan view thereof.

Fig. 3 is an inverted plan view of the carrier.

Fig. 4 is a plan view showing the complete amusement device including the projector, the runway, the loading platform and a number of carriers.

Fig. 5 is a vertical sectional view longitudinally through a portion of a carrier and the runway.

Figs. 6, 7, 8, 9 and 10 are vertical cross sectional views through the runway, the sections being taken respectively at 6—6', 7—7', 8—8', 9—9' and 10—10' Figure 4.

Fig. 11 is an enlarged detailed vertical sectional view through a portion of the runway and showing the manner in which the same is braced.

In the drawings like characters of reference indicate corresponding parts in the several figures.

In carrying out the invention, I employ a runway 1, a loading platform 2, a plurality of similar wheeled passenger carriers 3 and means for projecting the carriers onto the runway at a relatively high velocity, said means being generally indicated by the reference numeral 4.

The carrier as herein shown in each instance is constructed to simulate a toboggan and it comprises a flat bottom or base 5 having the forward end curved upwardly in a fanciful shape as indicated at 6, a seat 7 provided with an inclining back 8 and suitably supported side rods 9. Rearwardly the base 5 is supported by rollers or wheels 10 and 11 mounted on similar aligned cross shafts 12 carried by pairs of brackets 13 and 14 permanently secured to the under side of the base.

Forwardly the base is supported by similar castor wheels 15 and 16 mounted on short shafts 17 and 18 carried by swivelled forks 19 and 20. The forks are provided with rearwardly extending arms 21 and 22 pivotally connected together by a connecting rod 23 and similar springs 24 and 25 connect the rear ends of the arms with the under side of the base 5. The springs are not intended to prevent the castor wheels from freely turning when the carrier is operating on the runway as later described as they simply function to prevent the swivel wheels from chattering.

The forward end of the carrier is provided also with horizontally disposed guide rollers or wheels 27 and 28 suitably mounted on vertical spindles 29 and 30 and it will be observed that these wheels project beyond the edges of the base 5. Underneath the carrier I locate a length of belting 31 of suitable width which has the ends thereof fastened to the base 5 and between the belting and the base I insert a plurality of coiled springs 32.

In my amusement device a number of these carriers are employed and they are projected at comparatively high velocity onto the runway 1, it being understood that the passengers are loaded into the carriers at that part of the runway which is adjacent the platform 2, the platform being reached by the steps 2' and that the carriers all travel in the direction of the applied arrows Figure 1.

After each carrier is loaded, it is passed to the projector 4 and at this point, the runway is in the form of a straight horizontal flat bottomed trough 33 of predetermined length and having side guards 34 and 35. This trough shaped part of the runway is slightly wider than the width of the carrier and as the loaded passenger carriers are moved ahead from the loading platform to the projector, they are steered by the wheels 27 and and 28 coming in contact with the side flanges of the trough and causing the carriers to pass through the trough end on.

Centrally of the trough I locate a plurality of similar wheels 36 such as automobile wheels, the wheels being suitably spaced and all carried by cross axles 37, suitably mounted underneath the platform. The adjacent axles are connected by driving belts 38 so that all the wheels are driven in the same direction and provision is here made so that the several wheels are driven at a gradually increasing speed.

One of the shafts is driven by a belt 39 from an electric motor 40 or any other suitable source of power and the direction of rotation of the wheels is as indicated by the applied arrow Figure 5. Referring to the figure, it will be seen that the upper sides of the wheels project through the base of the trough and are adapted to come in contact with the belt 31 of a passenger carrier as the same is advanced by the wheels.

Assuming that a loaded passenger carrier is moved from the loading platform to the first wheel, it will be propelled along the trough first by engagement of the belt with the first wheel, then by the second wheel and so on throughout the series and the arrangement is such that when the carrier reaches the position as indicated by the specific carrier A Figure 4, it will be travelling at a considerable velocity.

Whilst I have entered into a detailed description of the particular device for propelling the carrier, any means can be employed to insure that the carriers will be projected onto the runway at the position occupied by the carrier A at a comparatively high velocity. The runway from the point occupied by the carrier A is subsequently designed such that the carrier operating under the forces acting will be self steering until it returns to a location approaching or at the loading platform.

The runway is herein shown as a winding one presenting a plurality of turns or bends and these turns or bends are all banked a greater or less amount depending for the greater part on the speed of travel of the carrier at any particular turn. If one observes the first turn after the carrier has left the point A, it will be seen that the cross section of the runway at 7—7' is somewhat less than a quarter circle whereas at 8—8' it is a full quarter circle. In other words, the banking gradually increases in passing from the point A towards the section indicated by the line 8—8'. Thereafter for the rest of the first turn, the banking gradually diminishes until a point is reached where there is a straight portion of the runway connecting the first turn with the second turn and this straight portion of the runway as indicated at B presents a cross sectional area as shown in Figure 9 where it will be observed that the bottom of the runway is downwardly bowed and there are side flanges 41 and 42 provided to avoid any possibility of the car jumping the runway. The second and following turns are all banked a greater or less amount depending on the velocity of the passing carrier and after the carrier has made the last turn, it runs into a narrow portion of the runway having a cross section as indicated in Figure 9 and this last portion of the runway returns the carrier, which is at this time moving at a comparatively low velocity, to the platform where it is reloaded.

I have pointed out that the design of the runway is such that the loaded passenger carrier is self steering as it moves along the runway and in designing the runway, the velocity at which the carrier is projected at the point A will of course be an important factor. As the forward wheels of the carrier are swivel wheels, their position will be controlled by the forces acting, namely, the velocity at which the carrier is moving, the inclination or bank given the track and the weight of the carrier and occupants. The resultant of these forces is the force acting to steer the carrier and as it moves over the runway, it will gradually climb up the banked runway at the bends, reaching its highest point at the centre of the bends and then moving down until it reaches those straight portions of the runway between the bends where the curved shape of the runway causes the front wheels to track straight ahead.

Obviously the general contour of the runway can be modified as desired and various other devices for giving additional thrills could be employed without departing from the spirit of the invention as set forth in the appended claims.

What I claim as my invention is:—

1. In an amusement appliance, in combination, a banked runway, a passenger carrier having castor wheels and means for projecting the carrier onto the runway at a comparatively high velocity, the banking of the runway being designed such that the moving carrier is self steering in its movement over the runway.

2. In an amusement device, in combination, a runway having bends therein and the bends banked, a passenger carrier provided with forward castor wheels and means for projecting the carrier onto the runway at a comparatively high velocity, the amount of banking at the bends of the runway being such that the passing carrier is self steering throughout its travel.

3. In an amusement device, a free runway having banked bends therein, a passenger carrier having forward castor wheels and means for projecting the loaded carrier onto the runway at a comparatively high velocity, the runway being banked at the bends in such a manner that the forces acting on the moving loaded carrier act to render the carrier self steering as it moves around the bends.

4. In an amusement device, a continuous runway having a series of turns therein and a straight guarded portion, a passenger carrier having the forward end carried by castor wheels, means for accelerating the passenger carrier on the straight guarded portion of the runway to cause the carrier to travel over the remaining part of the runway, the said bends in the runway being banked a greater or less amount depending on their radius of curvature and the velocity of the passing carrier and such that the carrier is self steering throughout its course.

5. In an amusement device, in combination a runway presenting a guarded straight portion, a wheeled carrier adapted to pass through such straight portion of the runway and a plurality of spaced wheels protruding through the runway and engageable with the passing carrier, said wheels being positively driven at varying speeds to gradually accelerate the movement of the carrier in passing through the straight portion of the runway.

6. In an amusement device, in combination, a runway having a guarded straight portion, a wheeled passenger carrier adapted to be passed through such portion of the runway and provided on the under side with a lengthwise extending cushioned member and a plurality of spaced driven wheels protruding through the runway and successively engageable with the cushioned member of the carrier as the carrier is passed through the runway, the said wheels being driven at varying speeds to accelerate the movement of the passing carrier.

7. In an amusement device, a passenger carrier simulating a toboggan and having the rear end mounted on carriage wheels and the forward end carried by castor wheels, said castor wheels being provided with rearwardly extending arms, a connecting rod pivotally connecting the arms and coiled springs connecting the arms with the bottom of the carrier.

8. In an amusement device, a passenger carrier simulating a toboggan and having the rear end mounted on carriage wheels and the forward end on castor wheels, a lengthwise extending strip of belting secured to the bottom of the carrier at the under side and cushioning means interposed between the length of belting and the carrier bottom.

9. In an amusement device, a passenger carrier simulating a toboggan and having the rear end mounted on carriage wheels and the forward end on castor wheels, a lengthwise extending strip of belting secured to the bottom of the carrier at the under side and springs interposed between the length of belting and the carrier bottom.

10. In an amusement device, a passenger carrier simulating a toboggan and having the rear end mounted on carriage wheels and the forward end on castor wheels, a lengthwise extending strip of belting secured to the bottom of the carrier at the under side and springs interposed between the length of belting and the carrier bottom and horizontally disposed guide wheels located at the front end of the carrier and projecting beyond the sides thereof.

Signed at Winnipeg, this 3rd day of August, 1926.

JOHN N. BARTLETT.